UNITED STATES PATENT OFFICE 2,305,260

WATER-SOLUBLE HETEROCYCLIC THERAPEUTIC COMPOUNDS

Jonas Kamlet, Brooklyn, N. Y., assignor to Merck & Co., Inc., Rahway, N. J., a corporation of New Jersey No Drawing. Application December 29, 1939, Serial No. 311,521

4 Claims. (Cl. 260—296)

The present invention relates to the preparation of water-soluble derivatives, and therapeutic agents containing such derivatives, of 2-sulfanilylamidopyridine suitable for oral and parenteral administrations to humans and animals in the treatment of pneumococci pneumonias and of diseases due to staphylococci, hemolytic streptococci, Friedlander's bacilli, meningococci, gonococci, and other infections due to pathogenic micro-organisms.

I find that by reacting 2-sulfanilylamidopyridine with sodium formaldehyde-bisulfite in equimolecular proportions and in a suitable medium, a new compound is obtained, 2-(p-(N-sodium methylene-sulfonate) aminobenzenesulphonamido)-pyridine:

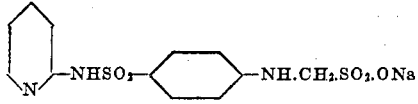

This compound may be prepared by the reaction of 2-sulfanilylamidopyridine and sodium formaldehyde-bisulfite (or formaldehyde and sodium bisulfite) in an aqueous medium at advanced temperatures. It may also be obtained either by converting 2-sulfanilylamidopyridine to its soluble sodium salt and refluxing a solution of the latter with sodium formaldehyde-bisulfite, or by reacting equimolecular proportions of 2-sulfanilylamidopyridine, sodium sulfite and formaldehyde, for the production of 2 (p-(N-sodium methylene-sulfonate) aminobenzenesulphon- (N'-sodium) amino)-pyridine, which is then reacted with one mole equivalent of dilute mineral or organic acid to yield the monosodium salt.

The medium for this reaction is not necessarily limited to aqueous solutions. It may be effected in a medium consisting of one or more members of a group comprising the well-known hydroxyalkyl solvents, i. e., the aliphatic alcohols, the aliphatic glycols and glycerin, as well as aqueous solutions of these solvents. Thus, equimolecular proportions of 2-sulfanilylamidopyridine and sodium formaldehyde-bisulfite (or formaldehyde and sodium bisulfite) in 50 per cent aqueous ethanol are refluxed on the boiling water-bath for two hours. The solvent is then evaporated off until a small volume of solution remains. This residue is now added in the cold to 50 volumes of acetone, and the copious, precipitated, white compound is filtered off. The 2-(p-(N-sodium methylene-sulfonate) aminobenzenesulphonamido)-pyridine thus obtained is a fine, white, microcrystalline powder, readily soluble in water. It is stable at all temperatures up to its melting point.

2-(p-(N-sodium methylene-sulfonate) aminobenzenesulphonamido) - pyridine, precipitated from acetone, forms white microcrystalline particles melting at 208–210° C., with decomposition. It is soluble in water at 37° C. to the extent of about 20 per cent, moderately soluble in alcohol, completely insoluble in acetone, ether, benzene, chloroform and ligroin. This compound is a weak reducing agent and may be determined quantitatively by titration with acidified permanganate, which it decolorizes. With alkali-earth metal salts and with heavy-metal salts, it forms insoluble or slightly soluble crystalline compounds.

The tolerance of experimental animals to 2(p-(N-sodium methylene-sulfonate) aminobenzenesulphonamido)-pyridine is good. Mice will tolerate daily injections of 1.5 grams per kilo of body weight over a prolonged period. When mice are infected with 100 lethal doses of a virulent culture of pneumococci, 50 per cent recovery is obtained in these mice by the daily administration of 0.5 gram per kilo of body weight, in four equal injections. Orally, the maximum tolerance of this compound in mice is about 4.0 grams per kilo of body weight.

The new compound, 2-(p-(N-sodium methylene-sulfonate) aminobenzenesulphonamido)-pyridine, has a comparatively low toxicity in human therapy, being four-fifths as toxic as the sodium methylene-sulfonate derivative of sulfanilamide. It has good chemotherapeutic specificity against pneumococcic, streptococcic and gonococcic infections.

For therapeutic use, 2-(p-(N-sodium methylene - sulfonate) aminobenzenesulphonamido)-pyridine can be compressed into tablets for oral administration, in which the drug's marked solubility and rapid absorption by the blood stream are advantageous. It may be distributed as a powder in weighed amounts into evacuated ampuls to be dissolved in sterile water immediately prior to injection. A solution of the drug may be directly prepared, packaged and sterilized, for parenteral use, as Example 2 describes.

The compound 2-(p-(N-sodium methylene-sulfonate) aminobenzenesulphonamido) - pyridine is miscible and compatible with serum in all proportions and may be administered parenterally in admixture with type-specific antipneumococcic serum. In such a use, it is important that the type of the causative pneumococcic organism should be determined before the combined theapy is instituted, since the administration of a 2-sulfanilylamidopyridine compound may interfere with subsequent pneumococcus sputum typings.

When 2-(p-(N-sodium methylene-sulfonate) aminobenzenesulphonamido)-pyridine is reacted with an equivalent quantity of concentrated aqueous or alcoholic sodium hydroxide, the disodium salt is obtained:

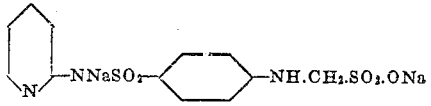

This compound is 2-(p-(N-sodium methylene-sulfonate) aminobenzenesulphon (N'-sodium) amido)-pyridine. It is precipitated from acetone as a white, amorphous compound, melting at 236–240° C., with decomposition, readily soluble in water, moderately soluble in alcohol, insoluble in acetone, ether and other organic solvents. Chemically and pharmacologically, it closely resembles the monosodium salt described in the foregoing.

Although this disodium salt is too alkaline for parenteral administration, it may be given by mouth or, in solution, by rectum. A solution of the disodium salt, suitably adjusted to pH 7.5, may be admixed with type-specific anti-pneumococcic serum, for parenteral administration.

The pH of a freshly prepared 10 per cent solution of 2-(p-(N-sodium methylene-sulfonate) aminobenzenesulphonamido)-pyridine is about 5.0. The pH of a freshly prepared 10 per cent solution of 2-(p-(N-sodium methylene-sulfonate) aminobenzene-sulphon(N'-sodium) amido)-pyridine is about 11.0. Each of these compounds may be adjusted to pH 7.5 (the pH of the blood) and will remain stable when so adjusted.

When the disodium salt is reacted with an equivalent quantity of 50 per cent acetic acid or dilute mineral acid, the free acid is formed:

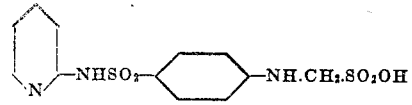

This compound is 2-(p-(N-methylene-sulfonic acid) aminobenzene sulphonamido)-pyridine, obtained from its aqueous solution as white, amorphous particles melting at 216–220° C., with decomposition. When heated with strong mineral acids, this compound yields sulfapyridine, formaldehyde and sulphur dioxide. This acid is soluble in caustic alkali solutions, moderately soluble in water and alcohol, and insoluble in all other organic solvents. It is useful as the parent substance of the foregoing monosodium and disodium derivatives and of alkaline earth, heavy metal, and organic salts.

The following examples are given by way of illustration and not of limitation, as it is obvious that certain modifications may be made in the steps of these processes, and in the kinds and proportions of the materials employed, without departing from the spirit and scope of the invention and the purview of the claims.

*Example 1*

To a solution of 75 grams of 40 percent formaldehyde solution and 105.0 grams of chemically pure sodium bisulfite in 2 liters of water is added 250.0 grams of 2-sulfanilylamidopyridine powder. The mixture is heated on the boiling water-bath with constant stirring for two hours and is then filtered from a small amount of insoluble precipitate. The hot filtrate is evaporated to 1 liter under vacuum, chilled rapidly to room temperature and added to 50 liters of acetone. The copius white precipitate that forms on standing is filtered off, washed with acetone and dried in vacuo. About 340 grams of 2-(p-(N-sodium methylene - sulfonate) aminobenzenesulphonamido)-pyridine is thus obtained.

*Example 2*

Into a large, hard-glass Erlenmeyer-type flask is placed 4000 cc. of distilled water, 137 grams of 2-sulfanilylamidopyridine and 88 grams of sodium formaldehyde-bisulphite (analyzing $$HO.CH_2.SO_2ONa.H_2O)$$

A funnel is placed in the neck of the flask and the contents are heated to boiling. Spattering may occur, but loss is avoided as the materials deposited on the walls of the flask and funnel are washed back into the solution by condensing steam.

After boiling gently for 15 to 20 minutes, a clear solution is obtained. The funnel is removed and boiling is continued for 60 minutes longer. The volume of the hot solution will now be about 1800 to 1850 cc. and its pH 4.8 to 5.4. The pH is adjusted to 7.5 by the dropwise addition of a 5 per cent sodium hydroxide solution, with the aid of a potentiometer, and the volume of the solution is brought up to 2 litres with distilled water. The flask is stoppered with a wad of sterile non-absorbent cotton and allowed to cool spontaneously by standing at room temperature for an hour.

The slight amount of unreacted 2-sulfanilylamidopyridine that forms on standing is filtered off and the clear, almost colorless filtrate is distributed into sterile ampuls and vials. These are now sterilized in the autoclave, sealed while hot, and so make available a therapeutic 10 per cent solution of 2-(p-(N-sodium methylene-sulfonate) aminobenzenesulphonamido)-pyridine ready for clinical use.

*Example 3*

52 grams of anhydrous sodium sulfite is dissolved in 800 cc. of water. To the resultant solution are then added 32.5 grams of 40 per cent formaldehyde solution, 73.5 grams of 36 percent acetic acid and 100 grams of 2-sulfanilylamidopyridine powder. The mixture is refluxed until a clear solution is obtained, 1 gram of activated animal charcoal is now added, the refluxing is then continued for thirty minutes, and the hot solution is filtered. The clear, almost colorless filtrate, when cooled to room temperature, has a pH of about 7.0. The solution is now evaporated to dryness in vacuo. The residue is then extracted with four successive 200 cc. portions of cold absolute alcohol until free of sodium acetate, recrystallized from aqueous solution by precipitation with twenty volumes of acetone, filtered off, and dried to constant weight.

The white product thus obtained is freely soluble in water and, on analysis, is found to be 2-(p-(N-sodium methylene-sulfonate) aminobenzenesulphonamido)-pyridine. The yield is 120 to 130 grams.

*Example 4*

10,000 units of Felton antipneumococcic rabbit serum type 1 is mixed with 10 cc. of a sterile solution containing 1 gram of either 2-(p-(N-sodium methylene-sulfonate) aminobenzenesulphonamido)-pyridine, which has been adjusted to a pH of 7.5 with 5 percent NaOH, or with 10 cc. of a sterile solution containing 1 gram of 2-(p-(N-sodium methylene-sulfonate) amino-benzene-sulphon (N'-sodium) amido)-pyridine, which has been adjusted to a pH of 7.5 with 5 percent Hcl. The resulting mixture is slowly injected intravenously, and is well tolerated.

*Example 5*

One gram of sterile 2-(p-(N-sodium methylene-sulfonate) aminobenzenesulphonamido)-pyridine powder is dissolved in 10,000 units of Felton antipneumococcic rabbit serum. The powder dissolves freely in the serum. Precautions are taken to preserve sterility. The resultant solution is slowly injected intramuscularly or intravenously after it has been determined that the patient is not allergically sensitive thereto.

I claim:
1. Compounds having the formula:

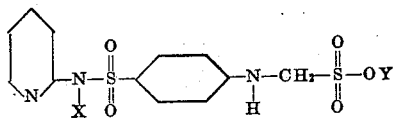

in which X and Y are taken from the class consisting of hydrogen and sodium, and in which Y is sodium when X is sodium.

2. 2-(p-(N-sodium methylene-sulfonate) aminobenzenesulphonamido)-pyridine.

3. 2-(p-(N-sodium methylene-sulfonate) aminobenzenesulphon (N'-sodium) amido)-pyridine.

4. 2-(p-(N-methylene-sulfonic acid) aminobenzenesulphonamido)-pyridine.

JONAS KAMLET.